(12) United States Patent
Park et al.

(10) Patent No.: US 8,270,252 B2
(45) Date of Patent: Sep. 18, 2012

(54) METHOD FOR ESTIMATING TARGET RANGE ERROR AND SONAR SYSTEM THEREOF

(75) Inventors: Joung-Soo Park, Changwon (KR); Young-Nam Na, Jinhae (KR); Young-Gyu Kim, Changwon (KR)

(73) Assignee: Agency for Defense Development, Daejeon (KR)

( * ) Notice: Subject to any disclaimer, the term of this patent is extended or adjusted under 35 U.S.C. 154(b) by 299 days.

(21) Appl. No.: 12/706,892

(22) Filed: Feb. 17, 2010

(65) Prior Publication Data

US 2011/0096630 A1 Apr. 28, 2011

(30) Foreign Application Priority Data

Oct. 28, 2009 (KR) ........................ 10-2009-0103042

(51) Int. Cl.
*G01S 15/00* (2006.01)
(52) U.S. Cl. ........................................................ 367/99
(58) Field of Classification Search .................... 367/99
See application file for complete search history.

(56) References Cited

U.S. PATENT DOCUMENTS

2007/0280051 A1 12/2007 Novick
2011/0096630 A1* 4/2011 Park et al. ................... 367/99

OTHER PUBLICATIONS

European Search Report dated Feb. 4, 2011, European Patent Application EP 10155799.
Hickman, et al., "Match-field depth estimation for active sonar," The Journal of the Acoustical Society of America, American Institute of Physics for the Acoustical Society of America, New York, NY, US, vol. 115, No. 2, Feb. 1, 2004, pp. 620-629.
Hines, et al., "Two-Way Time Spreading and Path Loss in Shallow Water at 20-40 kHz," IEEE Journal of Oceanic Engineering, IEEE Service Center, Picastaway, NJ, US, vol. 22 No. 2, Apr. 1, 1997.

* cited by examiner

*Primary Examiner* — Daniel Pihulic
(74) *Attorney, Agent, or Firm* — Vierra Magen Marcus & DeNiro LLP

(57) ABSTRACT

Disclosed is an active sonar system capable of estimating a direction and a range of a target by using a sound pulse. A target range error can be estimated by the active sonar system, by applying a principle that a sound pulse used to detect an underwater target with consideration of a vertical structure of a sound velocity in water is reflected and refracted through a multipath not a linear path.

13 Claims, 5 Drawing Sheets

METHOD FOR ESTIMATING TARGET RANGE ERROR AND SONAR SYSTEM THEREOF

CROSS-REFERENCE TO A RELATED APPLICATION

This application claims the benefit of and right of priority to Korean Application No. 10-2009-0103042, filed on Oct. 28, 2009, the contents of which is incorporated by reference herein in its entirety.

FIELD OF THE INVENTION

The present invention relates to a sonar (SOund NAvigation and Ranging) system capable of estimating a direction and a range of a target by using a sound pulse.

BACKGROUND OF THE INVENTION

A sonar system is an apparatus for estimating a direction and a distance (range) of an underwater target by using sound waves.

Generally, sound waves (sound pulses or rays) are used to detect an underwater target such as a submarine. Even if the sound waves propagate with a low velocity, they are used to detect a distant target due to its less energy loss than that of an electric wave. Accordingly, a sonar system for detecting an underwater target by using sound waves for military purposes is being utilized.

The sonar system is classified into two types, a passive type and an active type.

More concretely, the passive sonar system serves to detect noise emitted from a target, whereas the active sonar system serves to detect an echo reflected from a target by emitting a sound pulse. The passive sonar system can directly detect a direction of a target in secret. However, a long time and a complicated acoustic sensor are required to detect a target range. On the other hand, the active sonar system has an advantage to simultaneously detect a direction and a range of a target within a short time even if the detection is not executed in secret.

When the sonar system is used for military purposes, detection for a target range is the most important in anti-submarine warfare (ASW). For instance, during military operations such as anti-submarine warfare, a target range has to be rapidly detected. In this aspect, the active sonar system is regarded as a system for detecting a target for a military purpose.

The active sonar system (hereinafter, will be referred to as 'active sonar') has a configuration shown in FIG. 1.

Referring to FIG. 1, an acoustic pulse transceiver 2 transmits a sound pulse through an acoustic sensor 1, and receives a signal reflected from a target. A signal processor 3 performs a signal process such as beam-forming with respect to the received signal. And, a detector 4 determines whether a target signal is located or not based on a signal processed by the signal processor 3. Basic information of the target detected by the active sonar indicates a direction of the target, which means an azimuth and a range. The direction of the target is detected based on a beam-forming output according to each horizontal azimuth. And, the range of the target is detected based on time taken to receive an echo after transmitting a sound pulse.

FIG. 2 shows one example of a sound velocity profile and propagation paths of a sound pulse in water. Referring to FIG. 2, it is assumed that the targets 1 and 2 are used. R(1) and R(2) indicate horizontal ranges of a sound pulse between the active sonar and the target (1) and target(2) respectively. $R_{path}(1)$ and $R_{path}(2)$ represent paths of a sound pulse between the active sonar and the target (1) and target(2) respectively.

As shown in FIG. 2, the time ('$T_{echo}$') taken for a sound pulse is for 2-way propagation between the active sonar and targets, and consequently it is two times of the time for 1-way propagation from the active sonar to each target. Accordingly, the 1-way propagation time ('$T_{sonar}$') for detecting a target range is calculated by dividing the 2-way time ('$T_{echo}$') by two.

The target range ('$R_{sonar}$') from the active sonar to the target is calculated by multiplying the 1-way propagation time ('$T_{sonar}$') with sound velocity of the pulse.

Most active sonars assume paths from the active sonar to the targets to be linear. The linear assumption between the active sonar and targets leads to easy and simple target range calculations within a short time. As a sound velocity, most active sonars employ the reference value (C0). However, if one uses just one value of sound velocity such as the reference value in water depth, one may not obtain exact target ranges at each depth.

As shown in FIG. 2, propagation paths of the sound pulse in water are not linear. Even in a case where the active sonar and the target are fixed, multi-paths are inevitably generated due to various refractions, reflections, etc. FIG. 2 just shows representative path between the active sonar and each target among many possible paths. Referring to FIG. 2, even if the targets 1 and 2 are located in different depths, the time ($T_{path}(1)$) from the sonar to the target 1 along the path ($R_{path}(1)$) may be equal to the time ($T_{path}(2)$) from the sonar to the target 2 along the path ($R_{path}(2)$). In this case, if one does not consider refraction due to the depth variation of sound velocity, one may obtain the same target range from the $T_{path}(1)$ and $T_{path}(2)$. As shown in FIG. 2, however, the target 1 range (R(1)) is substantially different from that of the target 2 range (R(2)). The conventional methods employing linear assumption have inevitable errors in detection target ranges. These errors may result in poor target range accuracy and in failure of rapid ASW operations

SUMMARY OF THE INVENTION

Therefore, an object of the present invention is to provide a method capable of precisely calculating a detection target range by predicting a path of a sound pulse (ray) from an active sonar to the target, with consideration of substantial underwater environments with assuming that the path is not linear, and capable of estimating a target range error.

To achieve these and other advantages and in accordance with the purpose of the present invention, as embodied and broadly described herein, there is provided a method for estimating a target range error in an active sonar system, the method comprising: setting a search range boundary ($R_s$) of a target for range error estimation, under initial conditions of a 1-way target detection time ($T_{sonar}$) and a detection target range ($R_{sonar}$) detected by an active sonar (a); inputting environmental data of an area where the target is located (b); predicting a multipath eigenray time ($T_{path}(i,j,k)$) and a multipath eigenray pressure ($P_{path}(i,j,k)$) at each multipath (k), range (j) and depth (i) within the search range boundary ($R_s$), by detecting multipath eigenrays reflected from the target (c); filtering the detected multipath eigenrays so as to extract a dominant or first arrival path time ($R_{path}(i,j)$) among the detected multipath eigenrays (d); searching a horizontal range (R(i)) corresponding to a matching time ($T_{path}(i)$), the matching time that the filtered dominant or first arrival path time ($T_{path}(i,j)$) matches the target detection time ($T_{sonar}$)

detected at each depth (i) (e); and calculating a target range error ($R_{error}(i)$) between the searched horizontal range (R(i)) corresponding to the matching time ($T_{path}(i)$), and the detection target range ($R_{sonar}$) calculated based on the detected target detection time (f).

Preferably, in step (a), the 1-way target detection time ('$T_{sonar}$') may be calculated by dividing a 2-way target detection time ('$T_{echo}$') by two, the 2-way target detection time ('$T_{echo}$') taken for the active sonar to receive an eigenray reflected from the target after transmitting the eigenray.

Preferably, the detection target range may be calculated by multiplying the target detection time with a sound velocity.

Preferably, in step (a), the search range boundary ($R_s$) of the target may be within the limit of "$R_{sonar} - \Delta R < R_s < R_{sonar} + \Delta R$", and the $\Delta R$ may indicate a target range error allowable value.

Preferably, in step (b), the environmental data may comprise depths and an underwater sound velocity structure.

Preferably, in step (f), the target range error may be calculated through a following equation, $R_{error}(i) = R(i) - R_{sonar}$. Here, the 'R(i)' may indicate the searched horizontal range corresponding to the matching time ($T_{path}(i)$), and the '$R_{sonar}$' may indicate the detection target range calculated based on the detected target detection time.

According to another aspect of the present invention, there is provided a method for estimating a target range error in an active sonar system, the method comprising: (A) applying substantial underwater environmental data by setting a target detection time and a detection target range detected by an active sonar as initial conditions; (B) predicting a path of an eigenray transmitted from the active sonar to the target, and predicting an arrival time taken for the eigenray to reach the target, with consideration of a multipath, a depth, and an eigenray pressure; and (C) estimating a target range error by searching a horizontal range at each depth, the horizontal range corresponding to a matching time that the detected target detection time matches the predicted arrival time, based on a time of a dominant pressure path or a first arrival path filtered among the multipath eigenrays.

Preferably, the step (B) may comprise searching the target by the active sonar, and a search range boundary ($R_s$) of the target may be within the limit of "$R_{sonar} - \Delta R < R_s < R_{sonar} + \Delta R$", and the $\Delta R$ may indicate a target range error allowable value.

Preferably, in step (C), the target range error may be calculated through a following equation, $R_{error}(i) = R(i) - R_{sonar}$. Here, the 'R(i)' may indicate the searched horizontal range corresponding to the matching time ($T_{path}(i)$), and the '$R_{sonar}$' may indicate a detection target range calculated based on the target detection time detected by the active sonar.

To achieve these and other advantages and in accordance with the purpose of the present invention, as embodied and broadly described herein, there is also provided an active sonar system, comprising: an acoustic sensor; an acoustic pulse transceiver; a signal processor; and a detector, the active sonar system further comprising: a module configured to filter multipath eigenrays so as to extract a time of a dominant pressure path or a first arrival path among the multipath eigenrays, by predicting arrival times and pressures of eigenrays reflected from a target at each multipath, range, and depth, the module configured to search a horizontal range at each depth, the horizontal range corresponding to a matching time that the filtered arrival path time matches the detected target detection time, and the module configured to calculate a target range error between the searched horizontal range corresponding to the matching time ($T_{path}(i)$), and a detection target range calculated based on the detected target detection time.

Preferably, the module may be configured to perform: (1) setting a search range boundary ($R_s$) of a target for range error estimation, under initial conditions of a 1-way target detection time ($T_{sonar}$) and a detection target range ($R_{sonar}$) detected by an active sonar; (2) inputting environmental data of an area where the target is located; (3) predicting a multipath eigenray time ($T_{path}(i,j,k)$) and a multipath eigenray pressure ($P_{path}(i,j,k)$) at each multipath (k), range (j) and depth (i) within the search range boundary ($R_s$), by detecting multipath eigenrays reflected from the target; (4) filtering the detected multipath eigenrays so as to extract a dominant or first arrival path time ($T_{path}(i,j)$) among the detected multipath eigenrays; (5) searching a horizontal range at each depth, the horizontal range corresponding to a matching time that the filtered dominant or first arrival path time ($T_{path}(i,j)$) matches the detected target detection time ($T_{sonar}$); and (6) calculating a target range error ($R_{error}(i)$) between the searched horizontal range (R(i)) corresponding to the matching time ($T_{path}(i)$), and the detection target range ($R_{sonar}$) calculated based on the detected target detection time.

Preferably, in step (1), the search range boundary ($R_s$) of the target may be within the limit of "$R_{sonar} - \Delta R < R_s < R_{sonar} + \Delta R$", and the $\Delta R$ may indicate a target range error allowable value.

Preferably, in step (6), the target range error may be calculated through a following equation, $R_{error}(i) = R(i) - R_{sonar}$. Here, the 'R(i)' may indicate the searched horizontal range corresponding to the matching time ($T_{path}(i)$), and the '$R_{sonar}$' may indicate a detection target range calculated based on the target detection time detected by the active sonar.

The algorithm for estimating a target range error by the active sonar according to the present invention may have the following advantages.

Since a multipath due to reflections and refractions of a sound pulse is applied to the present invention with consideration of a vertical structure of a sound velocity in water, a detection target range may be precisely estimated and detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
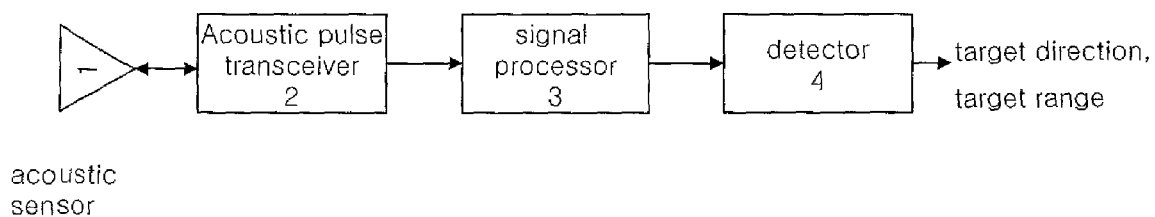
FIG. 1 is a block diagram schematically showing an active sonar system.

Description will now be given in detail of the present invention, with reference to the accompanying drawings.

The present invention is applied to an active sonar system capable of detecting a target. However, the present invention may be applied to all systems to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted.

The basic concept of the present invention is (1) applying substantial underwater environmental data by setting a target detection time and a detection target range detected by an active sonar as initial conditions; (2) predicting a path and an arrival time of a sound pulse transmitted from the active sonar to a target; and (3) estimating a target range error by searching a horizontal range that the target detection time matches the predicted arrival time (3).

Parameters Used in the Present Invention $T_{echo}$: 2-way target detection time;
Tsonar: 1-way target detection time;
$C_0$: reference sound velocity;
$R_{sonar}$: detection target range;
$R_s$: search range boundary;
i: 1, 2, . . . , l (depth);
j: 1, 2, . . . , m (range);
k: 1, 2, . . . , n (multipath);
$P_{path}(i,j,k)$: multipath eigenray pressure;
$T_{path}(i,j,k)$: multipath eigenray time;
$T_{path}(i,j)$: dominant or first arrival path time;
$T_{path}(i)$: matching time, i.e., filtered dominant or first arrival path time ($T_{path}(i,j)$) matches 1-way target detection time ($T_{sonar}$) detected by active sonar at each depth (i);
R(i): horizontal range corresponding to $T_{path}(i)$);
$R_{error}(i)$: target range error between horizontal range corresponding to $T_{path}(i)$) (R(i)) and detection target range ($R_{sonar}$) calculated based on target detection time detected by active sonar.

Figure 3:
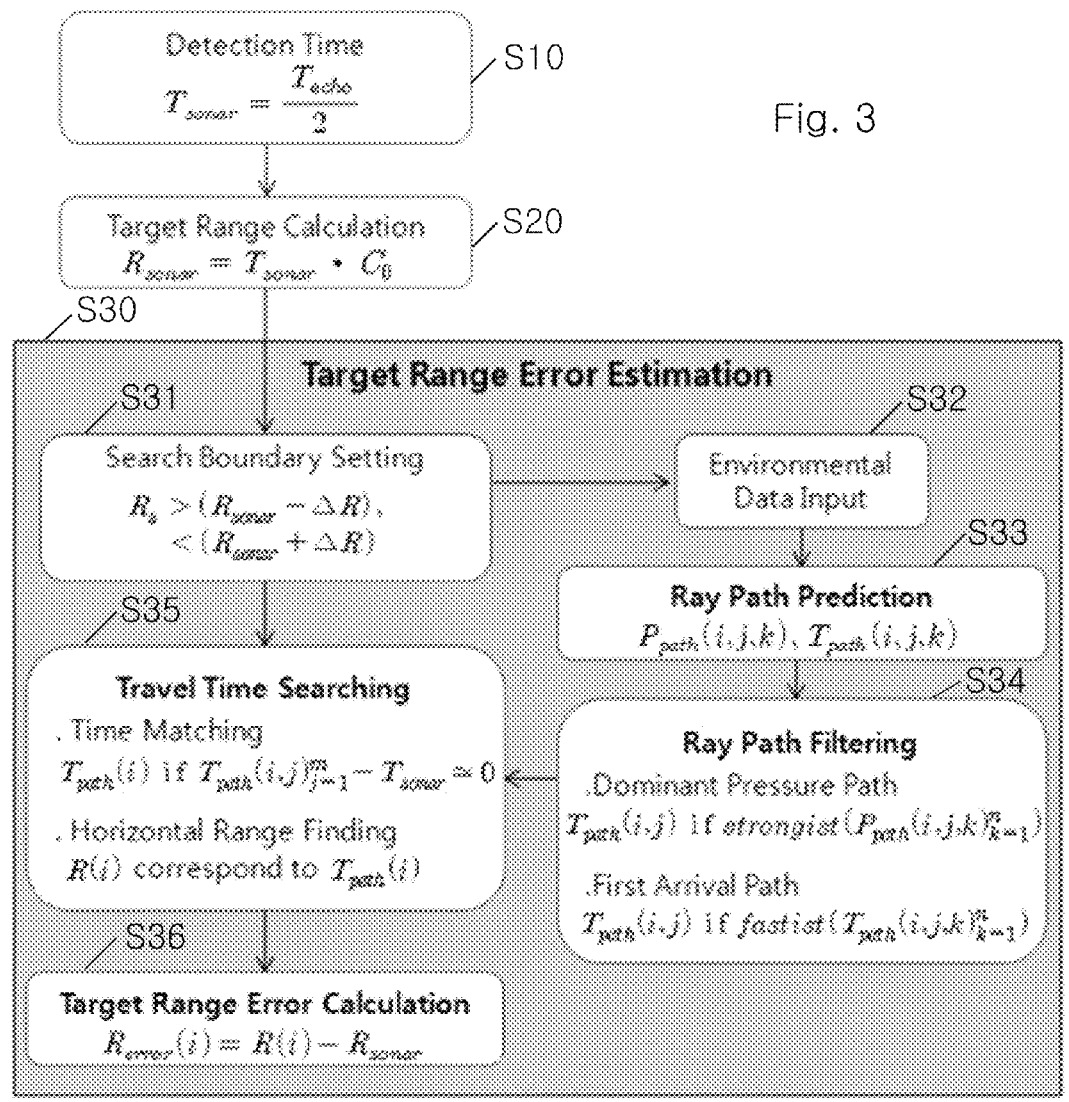
FIG. 3 is a flowchart showing an algorithm for estimating a target range error according to a first embodiment of the present invention.

FIG. 3 is a flowchart showing an algorithm for estimating a target range error according to a first embodiment of the present invention.

Figure 4:
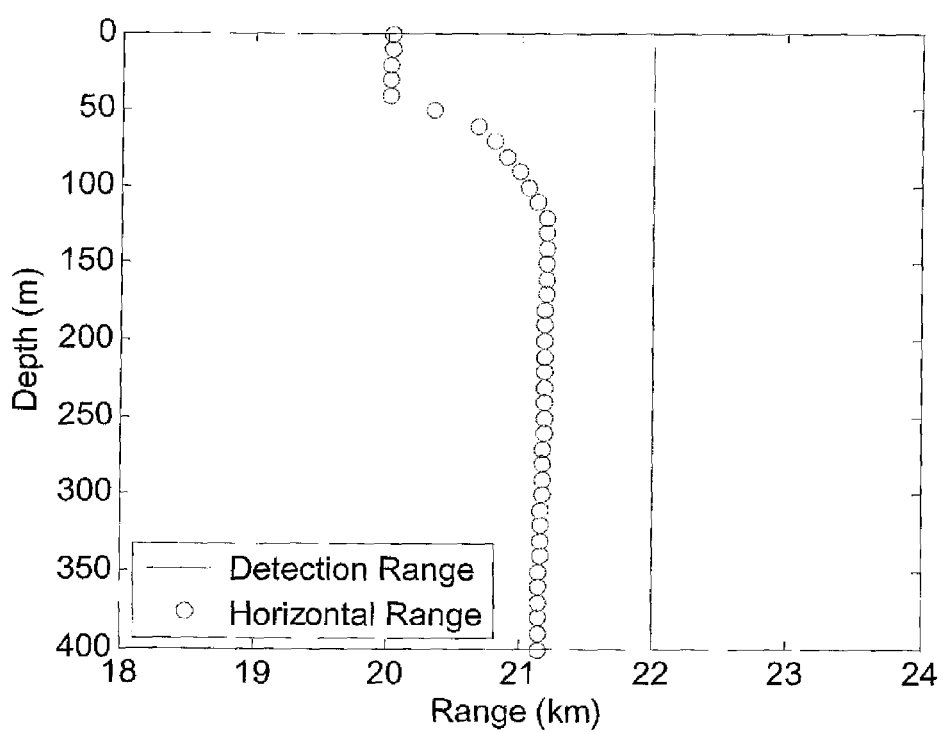
FIG. 4 is a graph showing target ranges detected at each depth according to the present invention.
Figure 5:
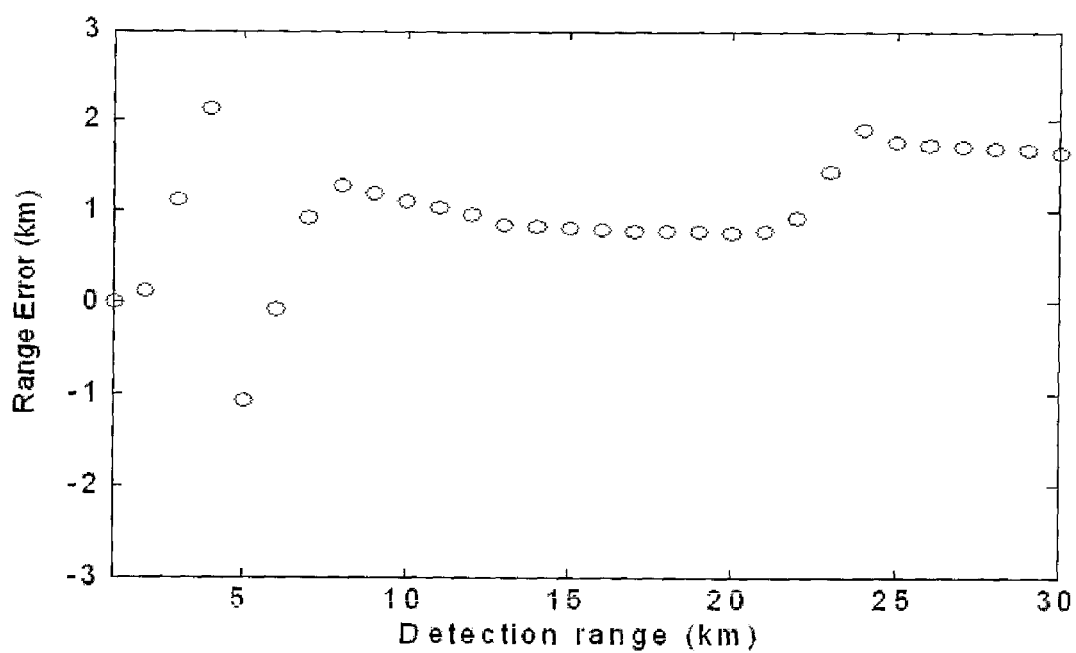
FIG. 5 is a graph showing target range errors according to detection ranges according to the present invention.

FIGS. 4 to 6 are graphs to which the algorithm of FIG. 3 have been applied.

FIG. 4 is a graph showing target ranges detected at each depth according to the present invention.

FIG. 5 is a graph showing range errors according to detection ranges according to the present invention.

Referring to FIG. 3, an algorithm for estimating a target range error comprises setting a search range boundary, predicting a ray path, filtering a ray path, searching a travel time, and calculating a target range error.

FIG. 3 shows an algorithm for applying substantial underwater environmental data by setting a target detection time and a detection target range detected by an active sonar as initial conditions, for predicting a path and an arrival time of a sound pulse transmitted from the active sonar to the target, and for estimating a target range error by searching a horizontal range that the target detection time matches the predicted arrival time.

Hereinafter, a method for estimating a target range error according to the present invention will be explained in more detail with reference to FIGS. 3 to 5.

As shown in FIG. 3, a search range boundary ($R_s$) is set by using a detection target range ($R_{sonar}$) detected by an active sonar so as to reduce time taken to estimate a target range error. It is assumed that a path of the detection target range ($R_{sonar}$) detected by the active sonar is linear. Accordingly, a substantial horizontal range of the target may be varied. However, since the target is disposed within a range ($\Delta R$) not far from the $R_{sonar}$, the search range boundary ($R_s$) is set to be within the limit of "$R_{sonar} - \Delta R < R_s < R_{sonar} + \Delta R$", with consideration of underwater environments.

A 2-way target detection time ('$T_{echo}$') taken for a sound pulse transmitted from the active sonar to be received by the active sonar due to reflection on the target corresponds to twice time taken for the sound pulse transmitted from the active sonar to reach the target. Accordingly, a 1-way target detection time ('$T_{sonar}$') utilized to calculate the detection target range is calculated by dividing the 2-way target detection time ('$T_{echo}$') by two (S10). The detection target range ('$R_{sonar}$') from the active sonar to the target is calculated by multiplying the 2-way target detection time ('$T_{echo}$') with a reference sound velocity ($C_0$) (S20).

Then, a target range error is estimated (S30). Hereinafter, S30 will be explained in more detail.

The search range boundary ($R_s$) for target range error estimation is set by having the detection target range ('$R_{sonar}$') as an initial condition (S31). In S31, $\Delta R$ indicates a target range error allowable value, and the search range boundary ($R_s$) has to be within the limit of "$R_{sonar} - \Delta R < R_s < R_{sonar} + \Delta R$". A basis of the target detection time may be variable according to an algorithm for detecting a target signal received by a signal processor and a detector of the active sonar. The target detection time may be calculated based on the following two. The first basis is "$R_{sonar} - \Delta R < R_s < R_{sonar} + \Delta R$" based on a fastest arrival time of a target signal, and the second basis is time of a dominant pressure path among multipath eigenrays.

Figure 2:
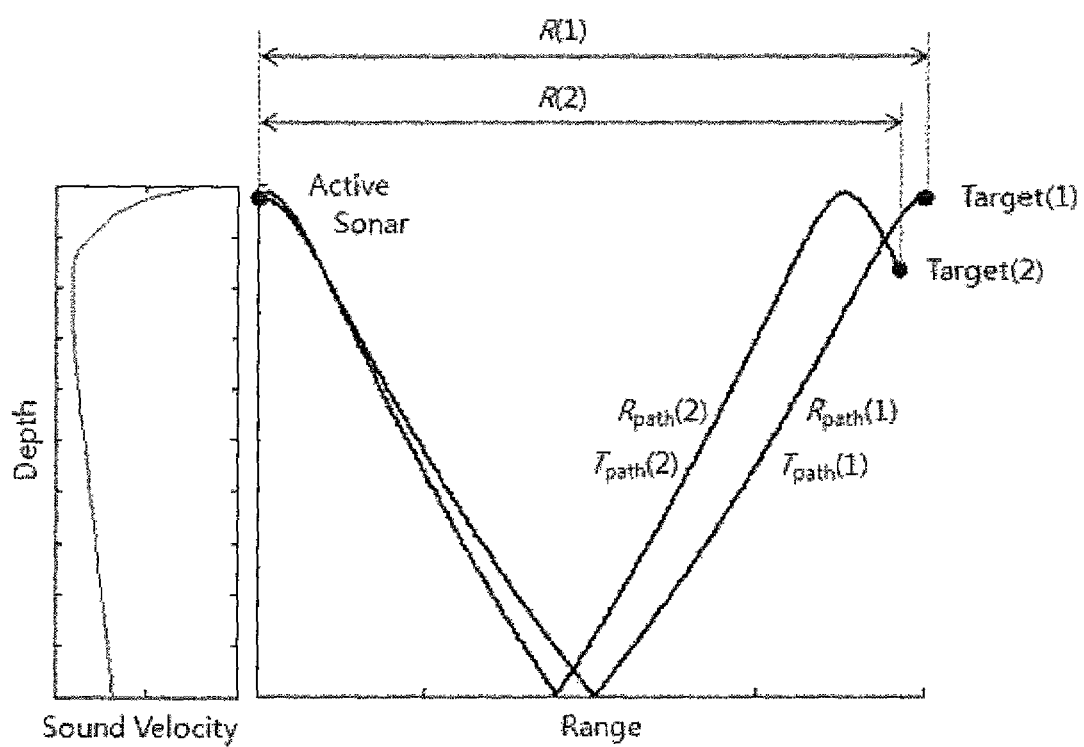
FIG. 2 is a view showing one example of a sound velocity structure and a propagation path of a sound pulse in water.

Then, environmental data including a depth, a sound velocity structure in water, etc. of an area where the active sonar and the target are located is input (S32). As shown in FIG. 2, the environmental data including a sound velocity structure in water, etc. absolutely required to predict a ray path may be directly observed on the spot, or may be extracted from the existing database.

In S33, multipath eigenrays implemented as a sound pulse propagates through reflections and refractions in water are predicted at each multipath (k), range (j) and depth (i) within the search range boundary ($R_s$), by applying a numerical analysis modeling method, i.e., a method for numerically analyzing a ray path, according to input data. And, a multipath eigenray time ($T_{path}(i,j,k)$) and a multipath eigenray pressure ($P_{path}(i,j,k)$) are predicted (S33).

According to an algorithm for detecting a target signal received by the signal processor and the detector of the active sonar shown in FIG. 1, a ray path filtering process is performed so as to extract a time ($T_{path}(i,j)$) of a dominant pressure path or a first arrival path among multipath eigenrays (S34). In the case of extracting the time ($T_{path}(i,j)$) in S34, a dominant pressure (strongest) path or a first arrival (fastest) path has to be extracted.

Then, a horizontal range that the filtered dominant or first arrival path time ($T_{path}(i,j)$) matches the target detection time ($T_{sonar}$) detected by the active sonar is searched at each depth (S35). In S35, a matching time ($T_{path}(i)$) is searched at each depth (i), the matching time that the dominant or first arrival path time ($T_{path}(i,j)$) matches the target detection time ($T_{sonar}$) detected by the active sonar. And, a horizontal range (R(i)) corresponding to the matching time ($T_{path}(i)$) is searched at each depth (i).

Here, the horizontal range (R(i)) corresponding to the matching time ($T_{path}(i)$) may indicate a precise detection target range corresponding to the 1-way target detection time ($T_{sonar}$), which is variable at each depth (i) of the target. Referring to the algorithm of FIG. 4, the detection target range of the active sonar is 22 km regardless of depths. However, the detected horizontal range (R(i)) is varied within a range of 20~21.2 km at each depth.

A target range error ($R_{error}(i)$) between the horizontal range (R(i)) corresponding to the matching time ($T_{path}(i)$) searched in S35 and the detection range calculated based on the target detection time detected by the active sonar is calculated by a following equation, "$R_{error}(i) = R(i) - R_{sonar}$" (S36). That is, in the step of calculating a target range error (S36), the target range error ($R_{error}(i)$) between the horizontal range (R(i)) corresponding to the matching time ($T_{path}(i)$) and the detection range calculated based on the target detection time detected by the active sonar is calculated by a following equation, "$R_{error}(i) = R(i) - R_{sonar}$". And, the target range error is varied at each depth. Referring to the algorithm of FIG. 5, while moving the detection target range ('$R_{sonar}$') detected by the active sonar by 1 km within a range of 1~30 km at a fixed depth of 100 m, target range errors were calculated. As a result of the calculation, the target range errors was variable within a range of −1.2~2.1 km. When the target range error is '−', it means that the target is located near the substantial detection target range. On the other hand, when the target range error is '+', it means that the target is located far away from the substantial detection target range.

By executing steps S10~S30, time taken to estimate a target range error may be shortened by limiting a search boundary range based on detection information obtained by the active sonar.

Furthermore, a ray tracing technique for precisely and rapidly predicting a ray path through efficient numerical analysis with consideration of an underwater sound velocity, etc. may be applied to the present invention. In order to estimate the target range error with accuracy, a ray path prediction interval such as a range interval and a depth interval has to be controlled.

Hereinafter, the active sonar system to which the preferred embodiment of the present invention may be applied will be explained. The sonar system according to the present invention comprises a module configured to execute the algorithm of FIG. 3. Here, the module may be configured for a software implementation and/or a hardware implementation.

That is, the active sonar system comprising an acoustic sensor, an acoustic pulse transceiver, a signal processor, and a detector further comprises a module configured to filter multipath eigenrays so as to extract a time of a dominant pressure path or a first arrival path among the multipath eigenrays, by predicting arrival times and pressures of eigenrays reflected from a target at different paths, ranges and depths, the module configured to search a horizontal range corresponding to a matching time that the filtered arrival time matches the detected target detection time, and the module configured to calculate a range error between the searched horizontal range corresponding to the matching time ($T_{path}(i)$), and the detection target range calculated based on the detected target detection time.

The module may execute the functions aforementioned with reference to FIG. 3 in more detail.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for estimating a target range error in an active sonar system, the method comprising:
   (a) setting a search range boundary ($R_s$) of a target for range error estimation, under initial conditions of a one-way target detection time ($T_{sonar}$) and a detection target range ($R_{sonar}$) detected by an active sonar;
   (b) inputting environmental data of an area where the target is located;
   (c) predicting a multipath eigenray time ($T_{path}(i,j,k)$) and a multipath eigenray pressure ($P_{path}(i,j,k)$) at each multipath (k), range (j) and depth (i) within the search range boundary ($R_s$), by detecting multipath eigenrays reflected from the target;

(d) filtering the detected multipath eigenrays so as to extract a time ($T_{path}(i,j)$) of a dominant pressure path or a first arrival path among the predicted multipath eigenrays;

(e) searching, at each depth, a horizontal range (R(i)) corresponding to a matching time ($T_{path}(i)$) that the filtered dominant or first arrival path time ($T_{path}(i,j)$) matches the detected one-way target detection time ($T_{sonar}$); and (f) calculating a target range error ($R_{error}(i)$) between the searched horizontal range (R(i)) corresponding to the matching time ($T_{path}(i)$), and the detection target range ($R_{sonar}$) calculated based on the detected one-way target detection time.

2. The method of claim 1, wherein in step (a), the one-way target detection time ('$T_{sonar}$') is calculated by dividing a two-way target detection time ('$T_{echo}$') by two, said two-way target detection time ('$T_{echo}$') is an amount of time taken for the active sonar to receive an eigenray reflected from the target after transmitting the eigenray, and wherein the detection target range is calculated by multiplying the one-way target detection time with a sound velocity.

3. The method of claim 1, wherein in step (a), the search range boundary ($R_s$) of the target is within the limit of "$R_{sonar} - \Delta R < R_s < R_{sonar} + \Delta R$", where the $\Delta R$ indicates a target range error allowable value.

4. The method of claim 1, wherein in step (b), the environmental data comprises depths and an underwater sound velocity structure.

5. The method of claim 1, wherein in step (f), the target range error is calculated through a following equation, $R_{error}(i) = R(i) - R_{sonar}$, where the 'R(i)' indicates the searched horizontal range corresponding to the matching time ($T_{path}(i)$), and the '$R_{sonar}$' indicates the detection target range calculated based on the target detection time detected by the active sonar.

6. A method for estimating a target range error in an active sonar system, the method comprising:

(A) applying substantial underwater environmental data by setting a target detection time and a detection target range detected by an active sonar as initial conditions;

(B) predicting paths of eigenrays transmitted from the active sonar to the target, and predicting arrival times taken for the eigenrays to reach the target, with consideration of a multipath, a depth, and an eigenray pressure; and (C) estimating a target range error by searching a horizontal range corresponding to a matching time that the target detection time matches the predicted arrival time, by filtering the multipath eigenrays so as to obtain a time of a dominant pressure path or a first arrival path.

7. The method of claim 6, wherein in step (C), a horizontal range corresponding to a matching time that the filtered first arrival time matches the target detection time is estimated at each depth by predicting the multipath eigenrays at each depth.

8. The method of claim 6, wherein the step (B) comprises searching the target by the active sonar, and a search range boundary ($R_s$) of the target is within the limit of "$R_{sonar} - \Delta R < R_s < R_{sonar} + \Delta R$", where the $\Delta R$ indicates a target range error allowable value.

9. The method of claim 6, wherein in step (C), the target range error is calculated through a following equation, $R_{error}(i) = R(i) - R_{sonar}$, wherein the 'R(i)' indicates the searched horizontal range corresponding to the matching time ($T_{path}(i)$), and the '$R_{sonar}$' indicates the detection target range calculated based on the target detection time detected by the active sonar.

10. An active sonar system, comprising:
an acoustic sensor;
an acoustic pulse transceiver;
a signal processor; and
a detector, the active sonar system further comprising:
 a module configured to filter multipath eigenrays so as to extract a time of a dominant pressure path or a first arrival path among the multipath eigenrays, by predicting arrival times and pressures of eigenrays reflected from a target at each multipath, range, and depth, and
 the module configured to calculate a target range error between a searched horizontal range corresponding to a matching time ($T_{path}(i)$), and a detection target range calculated based on a target detection time detected by the active sonar system.

11. The active sonar system of claim 10, wherein the module executes:

(1) setting a search range boundary ($R_s$) of a target for range error estimation, under initial conditions of a one-way target detection time ($T_{sonar}$) and a detection target range ($R_{sonar}$) detected by an active sonar;

(2) inputting environmental data of an area where the target is located;

(3) predicting a multipath eigenray time ($T_{path}(i,j,k)$) and a multipath eigenray pressure ($P_{path}(i,j,k)$) at each multipath (k), range (j) and depth (i) within the search range boundary ($R_s$), by detecting multipath eigenrays reflected from the target;

(4) filtering the detected multipath eigenrays so as to extract a time ($T_{path}(i,j)$) of a dominant pressure path or a first arrival path among the filtered detected multipath eigenrays;

(5) searching a horizontal range (R(i)) at each depth, the horizontal range corresponding to a matching time ($T_{path}(i)$) that the filtered dominant or first arrival path time ($T_{path}(i,j)$) matches the detected target detection time ($T_{sonar}$); and (6) calculating a target range error ($R_{error}(i)$) between the searched horizontal range (R(i)) corresponding to the matching time ($T_{path}(i)$), and the detection target range ($R_{sonar}$) calculated based on the target detection time detected by the active sonar system.

12. The active sonar system of claim 10, wherein in step (1), the search range boundary ($R_s$) of the target is within the limit of "$R_{sonar} - \Delta R < R_s < R_{sonar} + \Delta R$", where the $\Delta R$ indicates a target range error allowable value.

13. The active sonar system of claim 10, wherein in step (6), the target range error is calculated through a following equation, $R_{error}(i) = R(i) - R_{sonar}$, where the 'R(i)' indicates the searched horizontal range corresponding to the matching time ($T_{path}(i)$), and the '$R_{sonar}$' indicates the detection target range calculated based on the target detection time detected by the active sonar.

* * * * *